Sept. 27, 1966  J. B. ROSSO ET AL  3,275,898
VOLTAGE CONTROL CIRCUIT FOR CONVERTING IRREGULAR
VOLTAGE SPIKES TO PULSES OF PREDETERMINED
AMPLITUDE AND DURATION
Filed July 10, 1963
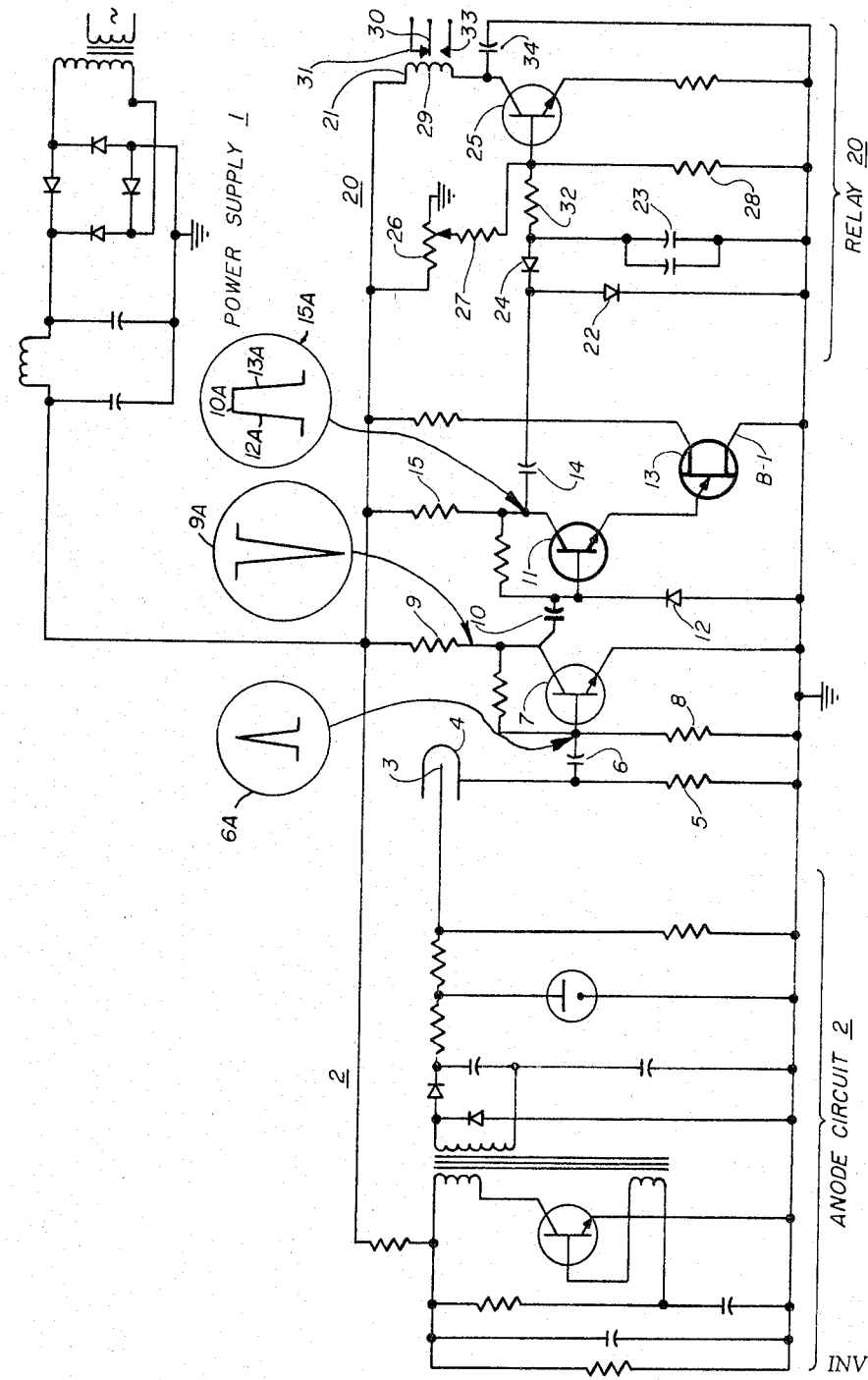
INVENTORS
JOHN B. ROSSO
DONALD E. SEAVER
BY
Arthur L Wade
ATTORNEY

United States Patent Office 3,275,898
Patented Sept. 27, 1966

3,275,898
VOLTAGE CONTROL CIRCUIT FOR CONVERTING IRREGULAR VOLTAGE SPIKES TO PULSES OF PREDETERMINED AMPLITUDE AND DURATION
John B. Rosso and Donald E. Seaver, Tulsa, Okla., assignors to National Tank Company, Tulsa, Okla., a corporation of Nevada
Filed July 10, 1963, Ser. No. 294,014
4 Claims. (Cl. 317—148.5)

The present invention relates to an electrical circuit for control of pulses of voltage. More particularly, the invention relates to a circuit which converts irregular pulses of voltage into pulses which are regular in size and suitably shaped for integration into a useful D.-C. voltage signal.

Certain primary elements exposed to variable conditions produce irregular pulses of voltage. The Geiger tube is a prime example of such primary element. Gamma rays, from a source controlled by a variable, strike the tube and cause ionization of the gas inside the tube. Current is thereby caused to flow between the anode of the tube and the ground connection. Any given quantity of the gamma rays generate voltage pulses of varying height and width. It is desired that each of these voltage variations be converted into a uniform voltage variation. Then the quantity of gamma rays to which the tube is exposed will be manifested by the quantity of these uniform pulses of voltage. The pulses can be integrated into a D.-C. voltage whose magnitude will represent the quantity of gamma rays reaching the tube.

The basic problem is that of converting sharp voltage pulses into pulses of voltage with a characteristic "square" shape of predetermined size. How do you charge a capacitance element with the voltage "spikes" and discharge the potential from the capacitance element to develop the desired voltage? Further, how do you do this with a simple, inexpensive, dependable, solid-state circuit?

A principal object of the present invention is to develop a high-energy wave of voltage from a "spike" of voltage with solid-state components.

Another object is to control the charge and discharge paths of a capacitor so sharp pulses of voltage will generate voltage pulses which rise quickly to a predetermined value, remain at the value for a predetermined length of time and fall quickly to their minimum value.

The present invention contemplates a capacitance in combination with charge and discharge paths controlled by a diode and transistors. Irregular pulses of voltage are applied to the capacitance and the charge and discharge paths for the pulses are controlled by the diode and transistors to develop voltage pulses in their output which rise quickly to a predetermined maximum, remain at the maximum for a predetermined time and return quickly to the initial level of potential.

Other objects, advantages and features of this invention will become apparent to one skilled in the art upon consideration of the written specification, appended claims, and attached drawing, wherein;

The single figure of the drawing is a schematic representation of the basic circuit of a unit in which the present invention is embodied.

The general system

The schematic circuit of the drawing shows the comple circuit in which the present invention is embodied. The circuit includes, at the one end, a Geiger tube and, at the other end, a relay. The tube responds, as a primary element, to a source of gamma rays and actuates, to manifest a predetermined magnitude of gamma rays, a solenoid relay. The invention is embodied in the electric network between the tube and relay, a network which specifically modifies the varying voltage impulses generated by the Geiger tube into square-wave pulses of voltage which can be integrated into a D.-C. voltage which will control the resistance of a transistor in the circuit of the solenoid relay and its power supply.

The power supply for the various sections of the circuit is generally indicated at 1. As disclosed, this circuit can be analyzed by one skilled in this art to be a conventional low voltage D.-C. power supply. The circuit between the power supply and the anode of the Geiger tube is indicated at 2. This circuit includes a transformer whose output is applied to a voltage doubler circuit followed by a gas-filled tube and potential divider circuit. Thus, the anode 3 of the tube 4 is provided with an operating D.-C. voltage.

Gamma rays striking the Geiger tube will cause ionization of the gas inside of the tube. The ions enable curent to flow between ground and anode 3, through resistance element 5. A voltage is developed across resistance 5 and, therefore, between the plates of capacitance 6, one plate of which is connected to resistance 5.

The other plate of capacitance 6 couples the voltage pulse to the base of transistor 7 which is a triode type of transistor. The D.-C. component of the voltage is isolated from the base of transistor 7 and the base is thereby supplied the increasing voltage as a pulse. The general shape of this voltage pulse is indicated at 6A.

Once the peak of the voltage pulse is reached, the current flow through resistance 5 ceases and the voltage across capacitance 6 discharges to ground through resistance 5 and resistance 8. This decay of the voltage pulse is the negative portion of the pulse. Therefore, the base of transistor 7 is supplied the positive (increasing) and negative (decreasing) portions of the voltage pulse generated by a ray striking the gas of the tube.

Amplification

Transistor 7 amplifies the voltage pulse 6A applied to its base. This amplifying arrangement is apparent to one skilled in the art. A resistance 9 is placed in circuit between the power supply and the collector of transistor 7. The emitter completes the circuit to ground. The resistance between the collector and emitter varies in accordance with the voltage applied to the base. Therefore, with the base receiving the voltage pulse 6A from tube 4, transistor 7 conducts in accordance with the variation of this pulse and a varying voltage is developed across resistance 9. In this manner a greater potential across resistance 9 can be controlled by the potential applied to transistor 7. Incidentally, the phase of the pulse which is developed across resistance 9 is inverted with respect to the controlling pulse. This amplification of the 6A voltage pulse is indidicated at 9A. This amplification and inversion is obtained in this manner in many other circuits. However, from this point on, the inventive concept has been applied to control this voltage pulse 6A from the tube, amplified as it may be into 9A by means such as transistor 7 represents.

Capacitance 10

One plate of capacitance 10 is connected to resistance 9 and the collector of transistor 7 to couple the amplified voltage 9A across resistance 9 to the base of transistor 11, also a triode type. Diode 12 is then connected between ground and the base of transistor 11. The decay or discharge of the voltage pulse 9A stored on capacitance 10 and applied to the base of transistor 11 is provided the path through diode 12. On the increase, or charge, of the voltage pulse 9A to capacitor 10, the circuit to this capacitance must be understood as completed through transistor 13 and the emitter-base circuit of transistor 11. Diode 12 is connected so as to block charging of capacitance 10 by the circuit in which diode 12 is included; the circuit through transistor 13 is thus forced to provide the charge path for capacitor 10.

We have now only to consider the voltage pulse generated at the collector of transistor 11 by the combination of capacitance 10, diode 12 and transistor 13 with this transistor 11. The variation of the pulse at the collector of transistor 11 will be the desirably modified pulse of tube 4 and is the production of the present invention. This pulse will be coupled by capacitor 14 to the integrator circuit which controls the relay at the other end of the complete circuit.

*Discharge of capacitance 10*

First, consider the discharge of capacitor 10. When we speak of this discharge we are simultaneously considering the lowering of the voltage on the base of transistor 11. When this base voltage lowers, the internal resistance of the transistor, between the collector and emitter, goes up; the emitter current of transistor 11 is reduced and transistor 13 ceases to conduct. However, as the internal resistance of transistor 11 goes up, the potential of the collector of this transistor goes up. Resistance 15 predetermines the maximum value of this potential rise which is one of the characteristics of the pulse produced. The rate of rise is predetermined by the efficiency of the discharge path; this is fixed by the diode 12 through which the discharge takes place.

*Charge of capacitance 10*

The high level of potential will be maintained as long as transistor 11 is cut off, or in a state of low conductance due to its high internal resistance. Next capacitance 10 begins to charge through the B–1 to emitter circuit of transistor 13 and the emitter to base circuit of transistor 11. The potential of the base of transistor 11 begins to increase. The internal resistance of transistor 11 begins to decrease until the emitter of transistor 13 reaches the characteristic predetermined emitter peak potential of transistor 13 at which point transistor 13 suddenly conducts heavily through transistor 11. This is brought about by the negative resistance characteristic of the unijunction transistor 13. This sudden switching of transistor 13 into a highly conductive state causes a surge of current through resistance 15 and a corresponding sudden decrease in the potential of the collector of transistor 11. The complete character of the pulse produced by the invention is thereby determined and generally indicated at 15A.

*Summary*

In summation, the pulse of voltage obtained at the collector of transistor 11, and applied to coupling capacitor 14, is molded in shape by this unique circuit. The rate of increase is indicated as 12A on voltage pulse 15A and is predetermined by the forward resistance of diode 12. The height of this pulse is determined by the value of resistance 15 and the level of the power supply. This height is uniform, regardless of the amplitude of pulses from tube 4. The width of the pulse is fixed by the value of capacitor 10 and the resistance of the charge path through transistors 11 and 13 and resistor 9, indicated at 10A. The rate of decrease is predetermined by the negative resistance characteristic of transistor 13, indicated as 13A.

*Relay circuit 20*

The circuit responsive to the pulse of voltage obtained at the collector of transistor 11 is generally indicated at 20. This circuit includes the circuit with which the pulses of voltage produced by the invention are used to control the actuation of relay 21. This circuit actuates relay 21 so the relay will respond only to the pulse repetition rate. Further, a time delay feature is included in the circuit so random variations in radiation rate of the radioactive source to which tube 4 is exposed will not actuate the relay.

More specifically, capacitance 14 is disclosed as the means to couple the voltage output of the invention to circuit 20. Diode 22 forms the charging path for capacitance 14. Diode 24 insures that potentials of reverse polarity will not be permitted to reach the negative plates of capacitance 23 and insures that the negative charge on capacitance 23 will not leak back into the previous network while also providing a discharge path for capacitance 14.

Transistor 25 is a triode type. The base is connected to a potential divider circuit comprising resistances 26, 27 and 28. With this network a predetermined positive D.-C. potential is applied to the base of transistor 25 to bring the internal resistance of the transistor low enough to energize relay coil 29 and pull its contact arm 30 into engagement with contact 31.

The voltage pulses from the collector of transistor 11 will leak off through resistance paths 32 and 28. Below a predetermined rate of pulse reception by capacitance 23, the negative charge of capacitance 23 applied to the base of transistor 25 will not build high enough to overcome the positive potential applied to the base of transistor 25. Of course, a sufficiently high pulse rate output of the novel circuit will overcome the positive bias and cause transistor 25 to become less conductive (higher internal resistance) and de-energize coil 29 of relay 21. Contactor 30 is then carried into connection with contact 33.

The collector of transistor 25 is connected to ground through capacitance 34. When the base potential falls and transistor 25 becomes less conductive, the potential of the collector tends to increase. Capacitor 34 charges through relay 21. The charge current of capacitance 34 is sufficient to keep relay 21 energized for a predetermined short period of time. When the base once more becomes positive enough to render transistor 25 conductive enough to energize relay 21, capacitor 34 discharges through the collector emitter circuit of the transistor before the relay can be energized. This time delay prevents random variations in radiation rate upon tube 4 from actuating relay 21.

Although a specific form of relay circuit is shown, responding to the pulse of voltage 15A obtained at the collector of transistor 11, it is to be understood that other configurations of this disclosed circuit will also respond to the voltage generated. In general, an integrating circuit is available to store the voltage pulses. The square-wave form of pulses 15A are predictable in their behavior as they are stored. Varying only in number, with respect to time, they are a predictable tool with which to operate any of a number of varieties of relay circuits.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A circuit for producing a voltage pulse, including, a source of a voltage pulse of very short duration, a capacitor connected by a first of its plates to the source, a triode type of transistor connected to the second plate of the capacitor at its base, a diode connected to the base of the transistor so as to function as a discharge path to ground for the capacitor, a unijunction transistor connected between the emitter of the triode transistor and ground, a resistance of predetermined value connected to the collector of the triode transistor, and a relay circuit connected between the junction of the resistance and the collector and a source of low voltage power to receive the output voltage pulse produced by the foregoing circuit.

2. A circuit for converting a series of irregular voltage spikes into voltage pulses of square-wave form and uniform magnitude, including, a source of low voltage D.-C. power, a Geiger tube mounted to receive radiation and connected by its anode to a source of D.-C. power supplied by the low voltage source, a capacitor connected by one plate to the tube to receive the sharp voltage spikes generated by radiation on the tube, a triode type of transistor connected to the other plate of the capacitor at its base, a diode connected to the base of the transistor so as to function as a discharge path to ground for the capacitor, a unijunction transistor connected between the emitter of the triode transistor and ground, a resistance of predetermined value connected to the collector of the triode transistor, and a relay circuit connected between the junction of the resistance and the collector and said source of low voltage power to receive the output voltage pulses of square-wave form produced by the foregoing circuit.

3. An electrical network for actuating a relay in accordance with radiation representative of a condition controlled by the relay, including, a Geiger tube mounted to receive radiation representative of a condition, a source of low voltage D.-C. power connected to supply a desired voltage to the anode of the Geiger tube, an amplifying electric network connected to the source and Geiger tube so as to receive the sharp spikes of voltage generated by the tube and generate large spikes of voltage, a capacitor connected by a first of its two plates to the amplifying electric network, a triode type of transistor connected at its base to the second of the two plates of the capacitor, a diode also connected to the transistor base so as to function as a discharge path to ground for the capacitor, a unijunction transistor connected between the emitter of the triode transistor and ground to function as a charge path for the capacitor, a resistance of predetermined value connected between the source and the collector of the triode transistor, and a relay connected to the source and the collector of the triode transistor to be held in one position until the output voltage pulses of square-wave form produced by the foregoing circuit reach a predetermined rate, at which time the relay is moved to another position in control of the condition producing the radiation.

4. A circuit for producing a voltage pulse, including, a source of a voltage pulse of very short duration, a capacitor connected by a first of its plates to the source, a triode type of transistor connected to the second plate of the capacitor at its base, a diode connected to the base of the transistor so as to function as a discharge path to ground for the capacitor, a transistor with a negative resistance characteristic connected between the emitter of the triode transistor and ground, a resistance of predetermined value connected to the collector of the triode transistor, and a relay circuit connected between the junction of the resistance and the collector and a source of low voltage power to receive the output voltage pulse produced by the foregoing circuit.

References Cited by the Examiner
UNITED STATES PATENTS 2,945,966 7/1960 Davenport _____ 307—88.5
3,170,124 2/1965 Candilis _____ 331—111

ARTHUR GAUSS, *Primary Examiner.*

S. D. MILLER, *Assistant Examiner.*